(12) United States Patent
Okamoto et al.

(10) Patent No.: US 6,414,749 B1
(45) Date of Patent: Jul. 2, 2002

(54) UNEVEN-PATTERN READING APPARATUS

(75) Inventors: Tatsuki Okamoto; Yukio Sato; Junichi Nishimae; Hiroyuki Kawano, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/459,925

(22) Filed: Dec. 14, 1999

(30) Foreign Application Priority Data

Dec. 24, 1998 (JP) ............................... 10-367844

(51) Int. Cl.⁷ .............................. G06K 9/74; G06K 9/00
(52) U.S. Cl. ......................................... 356/71; 382/127
(58) Field of Search ..................... 356/71; 382/124–127

(56) References Cited

U.S. PATENT DOCUMENTS

| | | | |
|---|---|---|---|
| 5,596,454 A | 1/1997 | Hebert | 359/726 |
| 5,621,516 A | 4/1997 | Shinzaki et al. | 356/71 |
| 5,625,448 A | 4/1997 | Ranalli et al | 356/71 |
| 6,127,674 A | * 10/2000 | Shinzaki et al. | 250/227.8 |
| 6,240,200 B1 | * 5/2001 | Wendt et al. | 382/127 |

* cited by examiner

Primary Examiner—Frank G. Font
Assistant Examiner—Layla Lauchman
(74) Attorney, Agent, or Firm—Leydig, Voit & Mayer, Ltd.

(57) ABSTRACT

An uneven-pattern reading apparatus includes a detecting prism having a detecting surface on which an uneven pattern is placed, an incident surface upon which an incident light beam for illuminating the uneven pattern is incident, and an emergent surface from which a light beam reflected from the uneven pattern on the detecting surface is emergent, angles between the respective detecting, incident, and emergent surfaces providing that the incident light beam is applied to the uneven pattern and the light reflected from the detecting surface is emergent from the emergent surface; an incident-light-beam converger for causing an incident light beam from a light source to be incident upon the incident surface after collimating or converging the incident light beam; an imaging device for detecting a reflected image emergent from the detecting prism; a converging optical system for collimating or converging the emergent light beam emergent from the emergent surface; and a processing device for identifying the uneven pattern on the basis of the image picked up by the imaging device, wherein an imaging surface of the imaging device is located closer to an emergent surface side than a focusing position of the converging optical system.

7 Claims, 14 Drawing Sheets

TO IMAGING DEVICE

TO IMAGING DEVICE

UNEVEN-PATTERN READING APPARATUS

BACKGROUND OF THE INVENTION

1. Field of the Invention

The present invention relates to an uneven-pattern reading apparatus for reading an uneven surface pattern such as a fingerprint used for identifying an individual.

2. Description of the Related Art

FIG. 15 is a schematic diagram of a conventional uneven-pattern reading apparatus, which is disclosed in, for instance, Japanese Patent Unexamined Publication No. 13446/1980. Reference character L denotes an incident light beam from a light source. Numeral 4 denotes a detecting prism which is a base for placing a finger for detecting a fingerprint. Numeral 5 denotes a fingertip. Numeral 5a denotes an uneven pattern such as a fingerprint. Numeral 7 denotes an imaging device for imaging the pattern of the fingerprint formed by a light beam which is emitted from the illuminating light and reflected from the finger. Numeral 8 denotes a processing device for processing the picked up image. Numeral 20 denotes an image-forming lens for forming an image of the pattern of the fingerprint on the imaging device. Numeral 21 denotes a television camera which is the imaging device. Numeral 41 denotes an incident surface of the detecting prism 4 upon which the light beam is made incident; 42 denotes a detecting surface of the detecting prism 4; and 43 denotes an emergent surface of the detecting prism 4 from which the reflected light beam is made emergent. Reference character L denotes the light beam.

Next, a description will be given of the operation. The fingertip 5 of a subject is brought into close contact with the detecting surface 42 of the detecting prism 4, and an incident light beam 1 incident upon the incident surface 41 of the detecting prism 4 is illuminated to the fingertip 5.

Here, if it is assumed that, at the detecting surface 42, the angle of incidence $\Theta i$ of the light beam L is greater than or equal to a critical angle $\Theta c$ with respect to an air layer, at the portion where the projecting surface of the fingerprint is in close contact, the light is transmitted through the interior of the finger, the amount of the reflected light beam from the detecting surface 42 is small. On the other hand, if there is an air layer formed by the detecting surface 42 and the projecting surface portions of the fingerprint at the finger tip 5, the incident light beam is totally reflected from the detecting surface 42.

Pattern information of the fingerprint, which is this reflected light beam, is outputted from the emergent surface 43 of the detecting prism 4. An image of this reflected light beam is formed on the imaging surface of the television camera 21 of the imaging device 7 to image the pattern of the fingerprint, and this pattern information is processed by the processing device 8, thereby making it possible to identify the fingerprint.

Since the conventional uneven-pattern reading apparatus is arranged such that the imaging surface of the imaging device 7 constitutes an imaging surface of the image-forming lens 20 with respect to the pattern of the subject, there has been a problem in that an optical path length of a predetermined length is required, making the apparatus large. In addition, there has been a problem, among others, in that if an attempt is made to make the apparatus compact by shortening the focal length, the pattern information becomes distorted, or a bright light source is required.

SUMMARY OF THE INVENTION

The present invention has been devised, and its object is to obtain a compact, lightweight uneven-pattern reading apparatus in which the optical path length from the detecting surface to the imaging surface is short.

An uneven-pattern reading apparatus in accordance with a first aspect of the present invention comprises: a detecting prism having a detecting surface on which an uneven pattern is placed, an incident surface upon which an incident light beam for illuminating the uneven pattern is incident, and an emergent surface from which a reflected light beam of the uneven pattern from the detecting surface is emergent, angles between the respective surfaces being provided such that the incident light beam is applied to the uneven pattern and the reflected light beam from the detecting surface is emergent from the emergent surface; incident-light-beam converging means for causing the incident light beam from a light source to be incident upon the incident surface after making the incident light beam from the light source parallel or convergent with respect to an optical axis of the incident light beam; an imaging device for picking up the reflected image emergent from the detecting prism; a converging optical system for converging the emergent light beam emergent from the emergent surface upon an imaging surface of the imaging device after making the emergent light beam emergent from the emergent surface parallel or convergent; and a processing device for identifying the uneven pattern on the basis of the image picked up by the imaging device, wherein an imaging surface of the imaging device is provided closer toward an emergent surface side than a focusing position of the converging optical system.

In an uneven-pattern reading apparatus in accordance with a second aspect of the present invention, vertical and horizontal magnifications of the incident-light-beam converging means or the emergent-light-beam converging means differ.

In an uneven-pattern reading apparatus in accordance with a third aspect of the present invention, the incident-light-beam converging means has diffusing means provided between the light source and the incident surface of the detecting prism for diffusing the light beam from the light source.

In an uneven-pattern reading apparatus in accordance with a fourth aspect of the present invention, the incident-light-beam converging means is arranged such that means for diffusing the light beam and means for making the light beam parallel or convergent are formed integrally.

In an uneven-pattern reading apparatus in accordance with a fifth aspect of the present invention, the detecting prism has means provided on the incident surface or the emergent surface for making the light beam parallel or convergent in a predetermined direction.

In an uneven-pattern reading apparatus in accordance with a sixth aspect of the present invention, the detecting prism has angles between surfaces for making the incident light beam and the emergent light beam parallel to the detecting surface.

In an uneven-pattern reading apparatus in accordance with a seventh aspect of the present invention, means for making the incident light beam upon the incident surface of the detecting prism has returning means for returning the light beam, the returning means being provided between the light source and the incident surface of the detecting prism or between the detecting surface and the imaging surface of the imaging device.

DETAILED DESCRIPTION OF THE PREFERRED EMBODIMENTS

First Embodiment

Figure 1A:
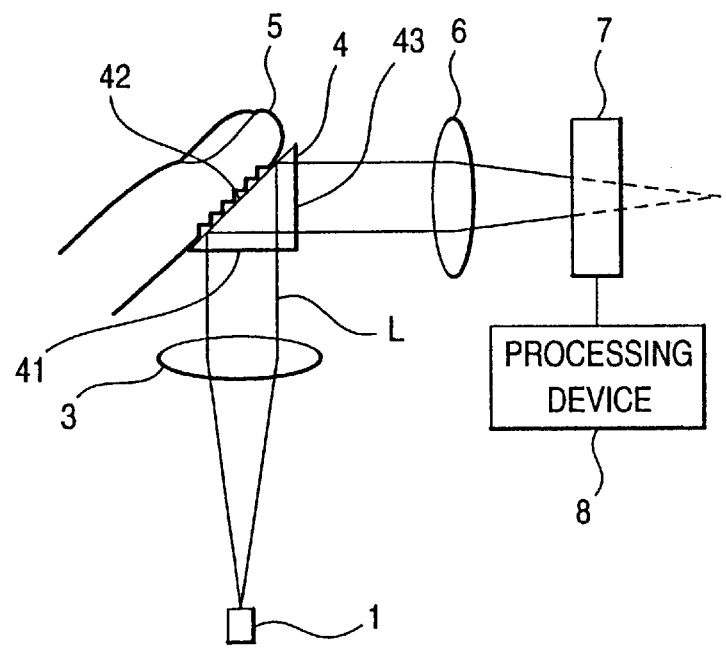
FIGS. 1A and 1B are schematic diagrams of an uneven-pattern reading apparatus in accordance with a first embodiment.
Figure 1B:
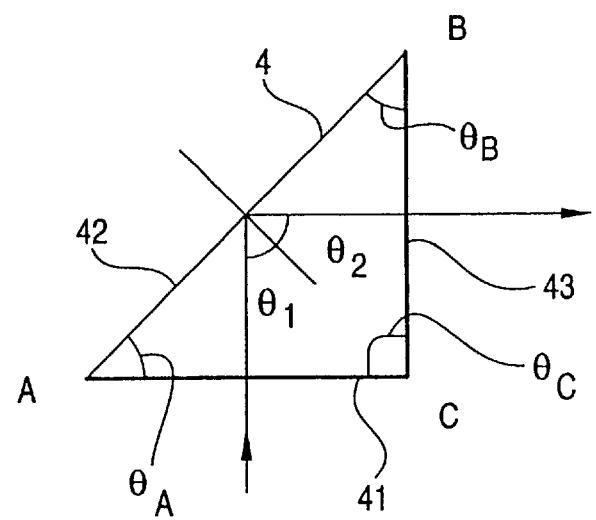

FIGS. 1A and 1B are schematic diagrams of an uneven-pattern reading apparatus in accordance with a first embodiment. FIG. 1A is a horizontal cross-sectional view, and FIG. 1B is an enlarged view of the portion of a detecting prism 4. Reference numeral 1 denotes a light source which emits an incident light beam L for illuminating an uneven pattern 5a which is a fingerprint of a fingertip 5. Numeral 3 denotes a collimator lens which converts the incident light beam L from the light source 1 to a parallel or convergent light beam. The incident light beam L is made incident upon an incident surface 41 of the detecting prism 4 by means of the light source 1 and the collimator lens 3.

Reference numeral 4 denotes the detecting prism which detects the uneven pattern 5a of the fingerprint of the fingertip 5 placed on a detecting surface 42, and is formed of, for instance, glass, resin, or the like. Numeral 41 denotes the incident surface of the detecting prism 4 upon which the light beam is made incident; 42 denotes the detecting surface of the detecting prism 4; and 43 denotes an emergent surface of the detecting prism 4 from which the light beam is made emergent.

The relationship between the direction of incidence of the incident light beam L and the incident surface of the detecting prism 4, which is shown in an enlarged view of the detecting prism 4 in FIG. 1B, is adjusted so that the incident light beam L is applied to the uneven pattern 5a by adjusting the angle θA between the incident surface 41 and the detecting surface 42 of the detecting prism 4. In addition, adjustment is made so that the emergent light beam is made emergent in a predetermined direction by adjusting the angle θB between the detecting surface 42 and the emergent surface 43.

Further, the angle θ1 of incidence of the incident light beam L upon the detecting surface 42 of the detecting prism 4 is adjusted to such an angle that satisfies the condition of total reflection in a case where the outer side of the detecting prism 4 is the air layer and at which the light is transmitted in the case of a portion in close contact with the finger.

Reference numeral 6 denotes a reducing lens which is a converging optical system for converging the reflected image on the detecting surface 42 onto the imaging surface of an imaging device 7. Numeral 7 denotes the imaging device, and its imaging surface is provided in a nonfocal plane closer to an emergent surface of the reducing lens 6 than the focusing position of the reducing lens 6. That is, the imaging surface of the imaging device 7 is disposed at such a position that the distance from the detecting surface 42 of the detecting prism 4 to that position is shorter than the distance from the detecting surface 42 of the detecting prism 4 to the image forming plane of the reducing lens 6 in which the image of the uneven pattern 5a is formed.

Hereafter, it is assumed that the image forming surface of the imaging device 7 shown in second to tenth embodiments is disposed in a similar relationship to the reducing lens 6.

Reference numeral 8 denotes a processing device which identifies the imaged uneven pattern 5a by comparing the image picked up by the imaging device 7 with the uneven pattern 5a such as the fingerprint which has been stored in advance. Since the other reference numerals denote members or portions that are similar to those of the conventional art, a description thereof will be omitted.

Next, a description will be given of the operation. Since the angle θ1 of incidence upon the detecting surface 42 is adjusted to such an angle that satisfies the condition of total reflection in a case where the outer side of the detecting surface 42 is the air layer and at which the light is transmitted in the case of a portion in close contact with the finger, it is possible to view a reflected image corresponding the unevenness of the fingerprint.

Further, if the pattern of a fingerprint imaged in the state in which the position of the imaging surface of the imaging device 7 is disposed at such a position that the distance from the detecting surface 42 to that position is shorter than the distance from the detecting surface 42 to the image forming plane is stored in advance, and if a newly imaged image pattern is compared by the processing device 8, it is possible to identify the imaged fingerprint.

In addition, since the position of the imaging surface of the imaging device 7 is disposed at such a position that the distance from the detecting surface 42 to that position is shorter than the distance from the detecting surface 42 to the image forming plane, it is possible to reduce the overall optical path length, so that it is possible to obtain a compact uneven-pattern reading apparatus.

Second Embodiment

Figure 2A:
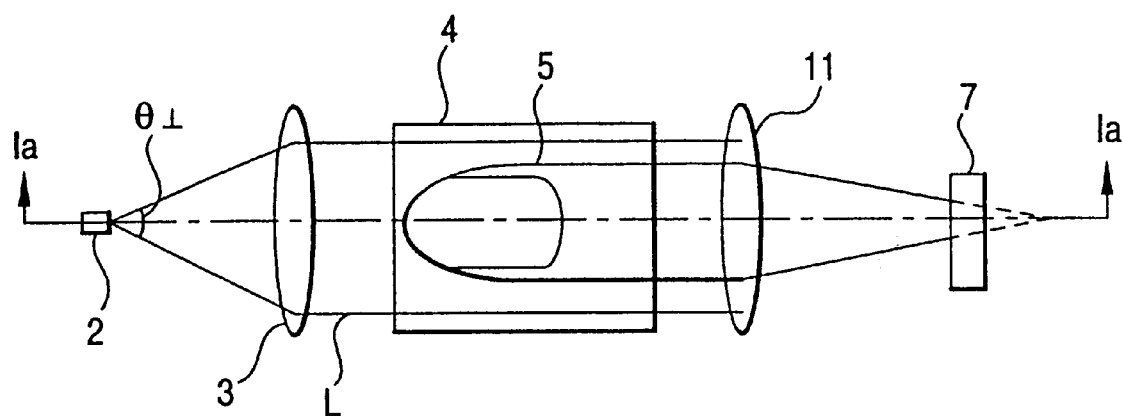
FIGS. 2A and 2B are schematic diagrams of an uneven-pattern reading apparatus in accordance with a second embodiment.
Figure 2B:
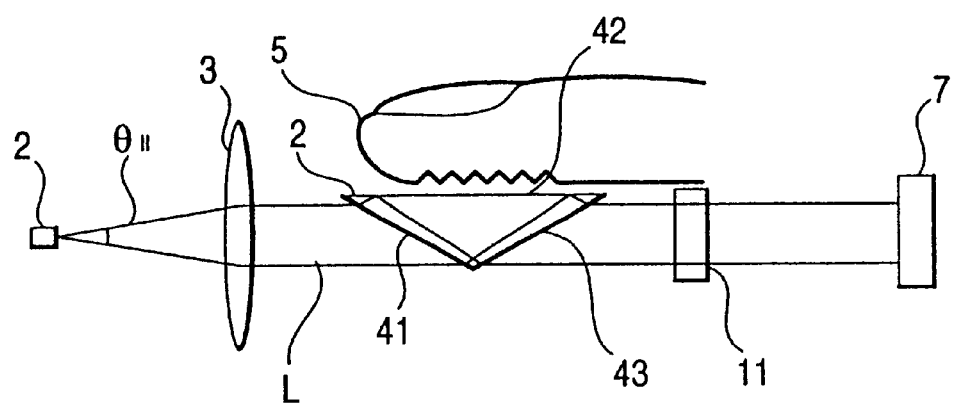

FIGS. 2A and 2B are schematic diagrams of an uneven-pattern reading apparatus in accordance with a second embodiment.

FIG. 2A is a plan view, and FIG. 2B is a cross-sectional view taken along line Ia—Ia of FIG. 2A. Reference numeral 2 denotes a light source which forms the light beam L with an elliptical cross section in which its horizontal angle of divergence θ// and its vertical angle of divergence θ⊥ differ. A semiconductor laser, for example, is used as the light source 2.

The detecting prism 4 is arranged such that the light beam 1 incident from the incident surface 41 is adjusted to an angle at which the light beam 1 is illuminated onto the detecting surface 42 in such a manner as to be enlarged in its vertical direction. Further, the light beam 1 is adjusted so as to be made emergent from the emergent surface 43 in such a manner as to be reduced in its vertical direction. Numeral 11 denotes a cylindrical lens for converging the reflected image from the detecting surface 42 onto the imaging surface of the imaging device 7, and is a lens for reducing only the reflected light in the horizontal direction.

In addition, with the uneven-pattern reading apparatus shown in FIGS. 2A and 2B, the angle θA between the detecting surface 42 of the detecting prism 4 and the incident surface 41 as well as the angle θB between the detecting surface 42 and the emergent surface 43 are set so that the incident light beam and the emergent light beam become parallel to the detecting surface of the detecting prism 4.

Next, a description will be given of the operation of the uneven-pattern reading apparatus in accordance with the second embodiment. The light, e.g. laser light, from a light source whose divergent angles in the horizontal direction and the vertical direction differ, is collimated to a light beam whose beam widths in the horizontal direction and the vertical direction differ by the collimator lens 3; however, if the light beam is made incident upon the detecting prism 4, the light beam L incident through the incident surface 41 is enlarged on the detecting surface 42 in the vertical direction, thereby making it possible to illuminate the overall uneven pattern.

Further, as shown in FIG. 2A since the light beam in the horizontal direction only is converged by the cylindrical lens 11, the reflected image in the horizontal direction which is wider than the size of the imaging surface of the imaging device 7 is reduced. As shown in FIG. 2B, the length of the reflected image in the vertical direction with a width shorter than that of the imaging surface remains as it is, thereby making it possible to converge the overall reflected image onto the imaging surface.

Accordingly, even if light sources whose vertical and horizontal divergent angles differ are used, it is possible to obtain a compact uneven-pattern reading apparatus.

Further, since the angle θA between the detecting surface 42 of the detecting prism 4 and the incident surface 41 as well as the angle θB between the detecting surface 42 and the emergent surface 43 are set so that the incident light beam and the emergent light beam become parallel, the apparatus can be made thin, thereby making it possible to obtain a compact uneven-pattern reading apparatus.

Third Embodiment

Figure 3A:
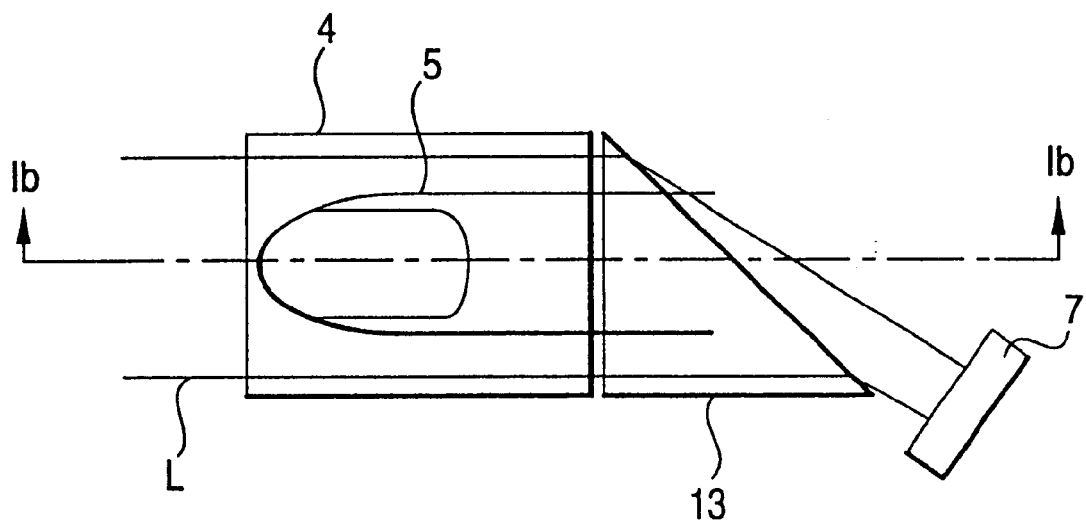
FIGS. 3A and 3B are schematic diagrams of an uneven-pattern reading apparatus in accordance with a third embodiment.
Figure 3B:
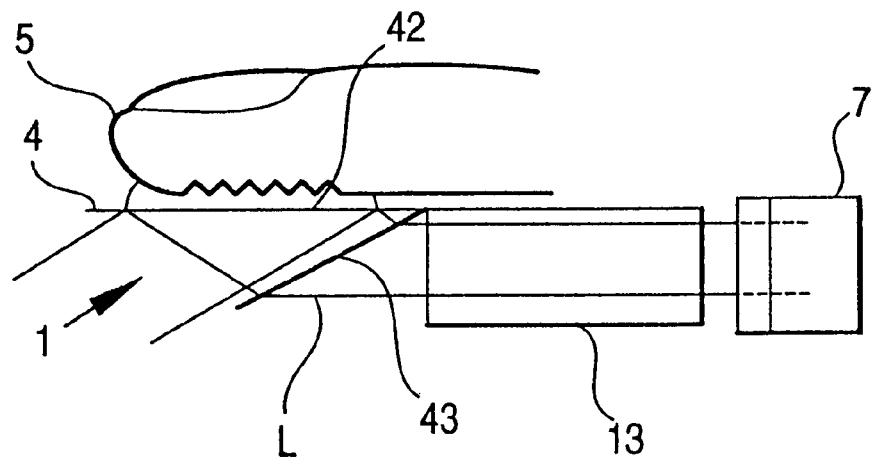

FIGS. 3A and 3B are schematic diagrams of an uneven-pattern reading apparatus in accordance with a third embodiment, and illustrates the arrangement of a section of emergence from the detecting prism 4. FIG. 3A is a plan view, and FIG. 3B is a cross-sectional view taken along line Ib—Ib of FIG. 3A. Reference numeral 13 denotes a reducing prism, which is a prism for reducing only the horizontal length. Since the other reference numerals denote members or portions that are similar to those of the second embodiment, a description thereof will be omitted.

By using the reducing prism 13 instead of the cylindrical lens 11 in FIGS. 2A and 2B, it is possible to obtain advantages similar to those of the uneven-pattern reading apparatus in accordance with the second embodiment.

Fourth Embodiment

Figure 4A:
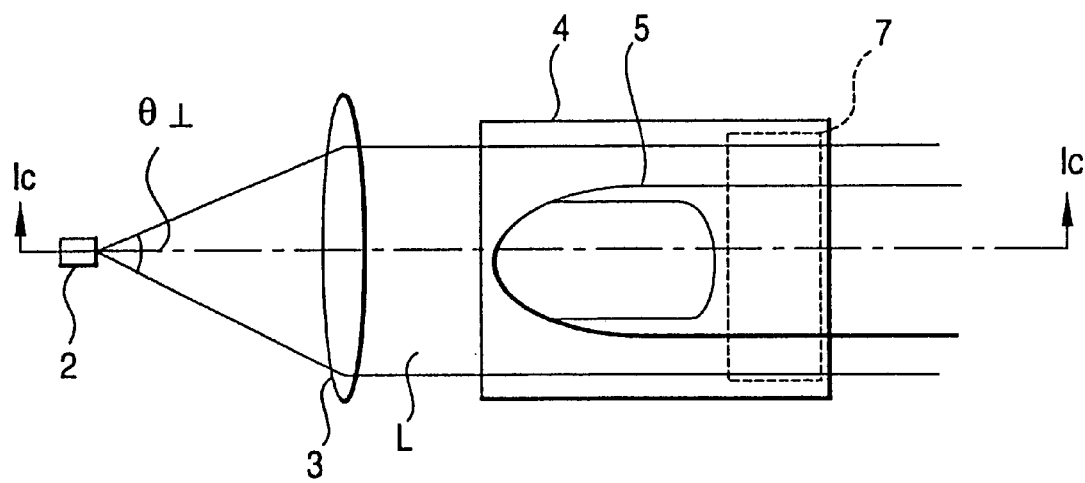
FIGS. 4A and 4B are schematic diagrams of an uneven-pattern reading apparatus in accordance with a fourth embodiment.
Figure 4B:
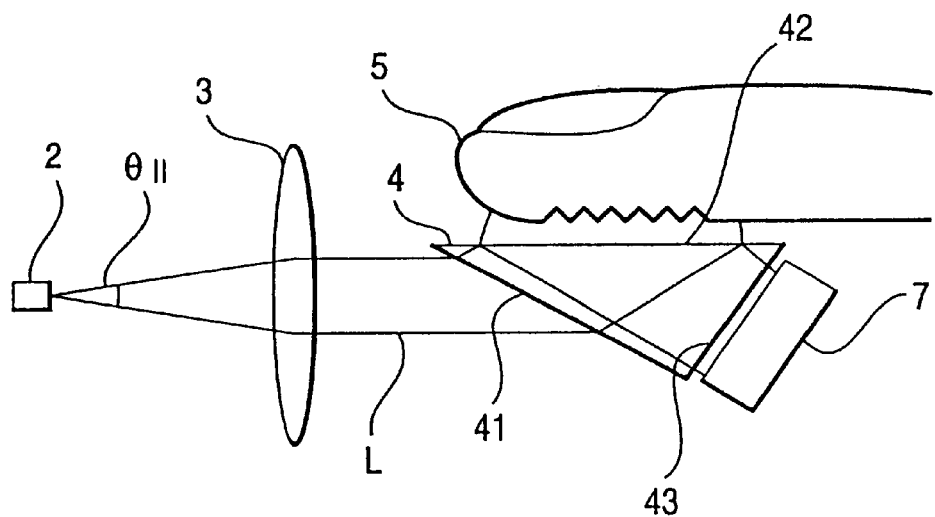

FIGS. 4A and 4B are schematic diagrams of an uneven-pattern reading apparatus in accordance with a fourth embodiment. FIG. 4A is a plan view, and FIG. 4B is a cross-sectional view taken along line Ic—Ic of FIG. 4A. Reference numeral 7a denotes an imaging device having an imaging surface with the same area as that of the emergent surface in terms of both the horizontal and vertical directions.

Since the imaging device 7a having a sufficient imaging area, the lens for reducing the reflected image is made unnecessary, so that it is possible to obtain a further compact uneven-pattern reading apparatus.

Fifth Embodiment

Figure 5A:
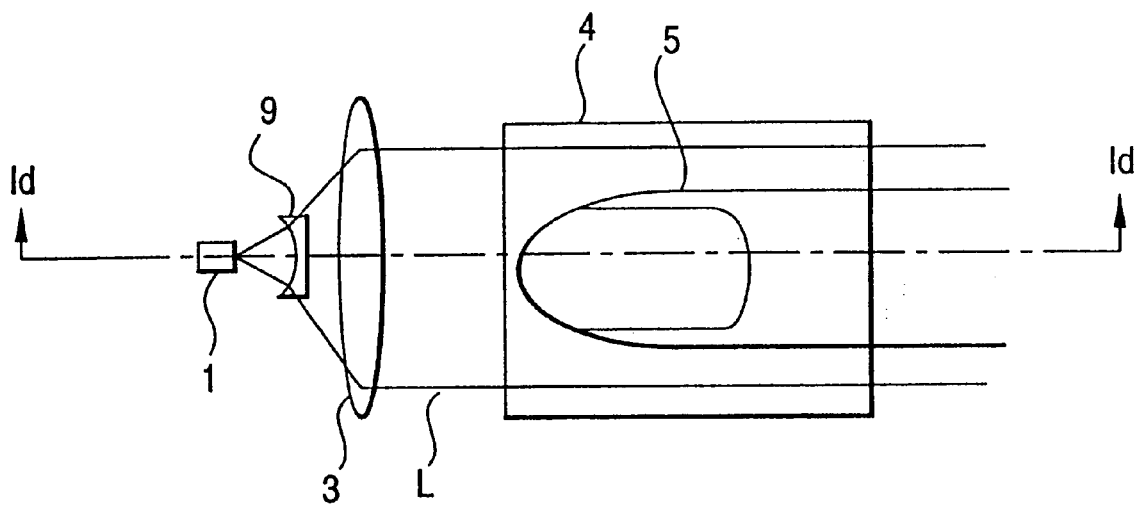
FIGS. 5A and 5B are schematic diagrams of an uneven-pattern reading apparatus in accordance with a fifth embodiment.
Figure 5B:
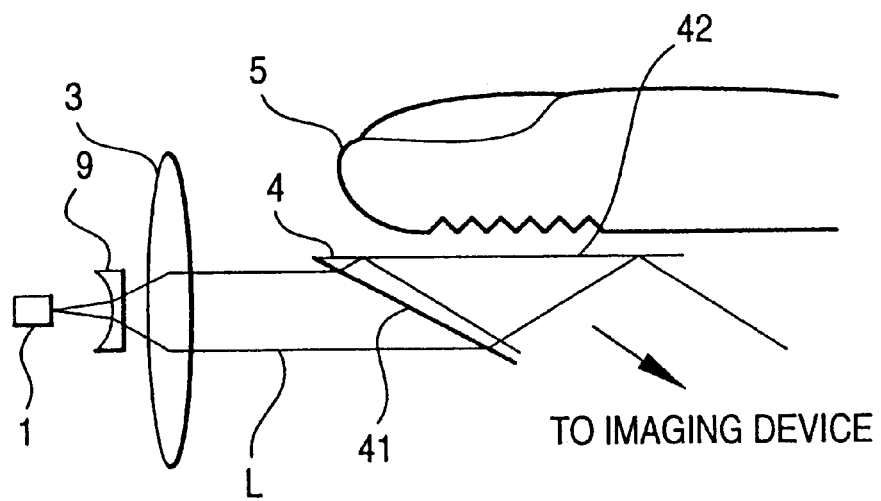

FIGS. 5A and 5B are schematic diagrams of an uneven-pattern reading apparatus in accordance with a fifth embodiment. FIG. 5A is a plan view, and FIG. 5B is a cross-sectional view taken along line Id—Id of FIG. 5A. Reference numeral 9 denotes a concave lens for enlarging the angle of divergence of the light beam L from the light source 1. Since the other reference numerals denote members or portions that are similar to those of the first to fourth embodiments, a description thereof will be omitted.

Next, a description will be given of the operation of the uneven-pattern reading apparatus in accordance with the fifth embodiment. Since the angle of divergence of the light beam L from the light source 1 is enlarged by the concave lens 9, it is possible to allow the light beam with an area capable of illuminating the overall detecting surface to be incident upon the collimator lens 3 at a distance close to the light source 1.

It should be noted that if the light source 1 is adapted to emit the light uniformly in the vertical and horizontal directions, the collimator lens 3 in FIGS. 5A and 5B can be omitted, and if the light is diverged by the concave lens 9 located in close proximity to the incident surface 41 from the light source 1, and is then made directly incident upon the incident surface 41, the distance between the concave lens 9 and the incident surface 41 can be made short.

Accordingly, the distance from the light source 1 to the collimator lens 3 can be made short, so that it is possible to obtain a compact uneven-pattern reading apparatus with a short overall length.

Sixth Embodiment

Figure 6A:
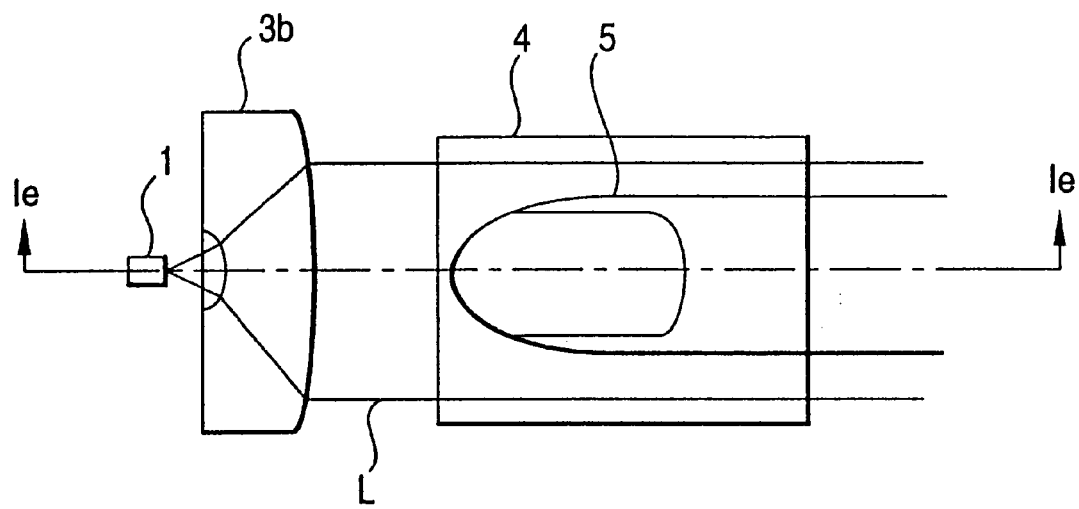
FIGS. 6A and 6B are schematic diagrams of an uneven-pattern reading apparatus in accordance with a sixth embodiment.
Figure 6B:
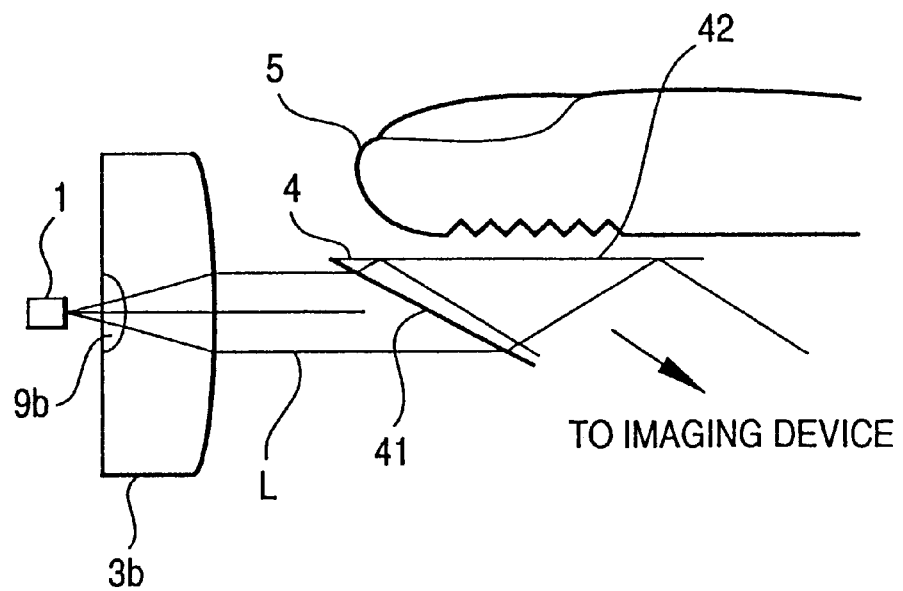

FIGS. 6A and 6B is a schematic diagram of an uneven-pattern reading apparatus in accordance with a sixth embodiment. FIG. 6A is a plan view, and FIG. 6B is a cross-sectional view taken along line Ie—Ie of FIG. 6A. Reference numeral 3b denotes a collimator lens which is obtained by integrally forming the concave lens 9 and the collimator lens 3 in FIGS. 5A and 5B. Since the other reference numerals denote members or portions that are similar to those of the first to fifth embodiments, a description thereof will be omitted.

Thus, with the uneven-pattern reading apparatus in accordance with the sixth embodiment, since the concave lens 9 and the collimator lens 3 in FIGS. 5A and 5B are formed integrally, the number of component parts can be reduced, thereby making it possible to obtain a compact uneven-pattern reading apparatus.

Seventh Embodiment

Figure 7A:
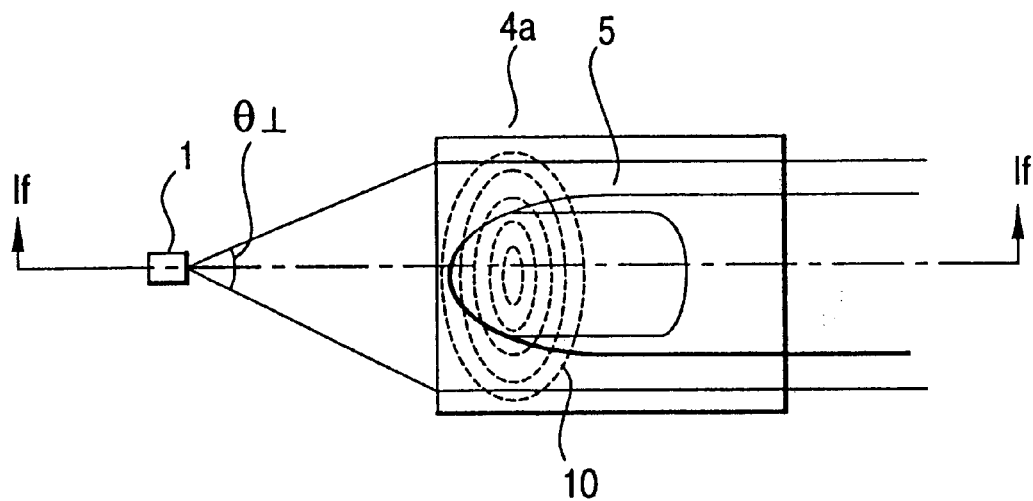
FIGS. 7A and 7B are schematic diagrams of an uneven-pattern reading apparatus in accordance with a seventh embodiment.
Figure 7B:
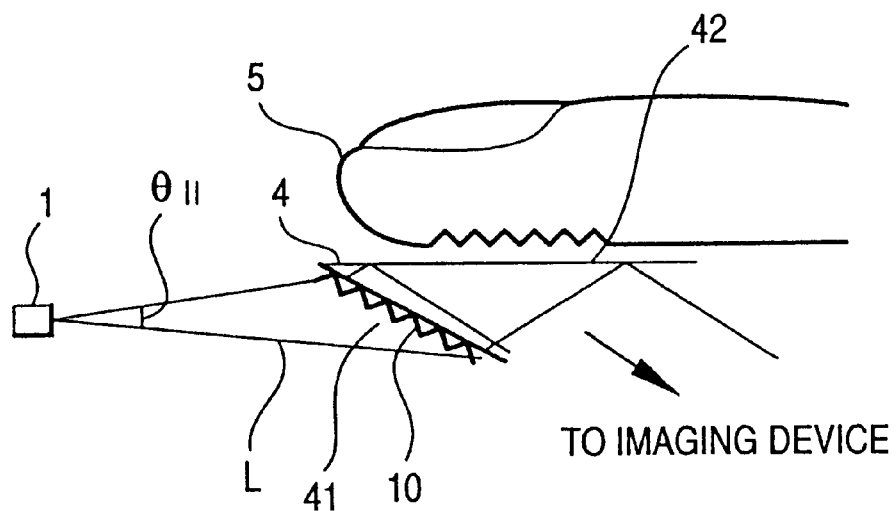

FIGS. 7A and 7B are schematic diagrams of an uneven-pattern reading apparatus in accordance with a seventh embodiment. FIG. 7A is a plan view, and FIG. 7B is a cross-sectional view taken along line If—If of FIG. 7A. Reference numeral 10 denotes a collimating fresnel lens which is formed integrally on the incident surface 41 of the detecting prism 4 so as to convert the incident light beam L into a parallel beam or convergent beam inside the detecting prism 4. Since the other reference numerals denote members or portions that are similar to those of the first to third embodiments, a description thereof will be omitted.

Next, a description will be given of the uneven-pattern reading apparatus in accordance with the seventh embodiment. Since the incident light beam L can be applied to the overall detecting surface 42 as the parallel beam or convergent beam inside the detecting prism 4 by the collimating fresnel lens 10, the collimator lens 3 can be omitted, so that the number of component parts can be reduced, thereby making it possible to obtain a compact uneven-pattern reading apparatus.

Figure 8A:
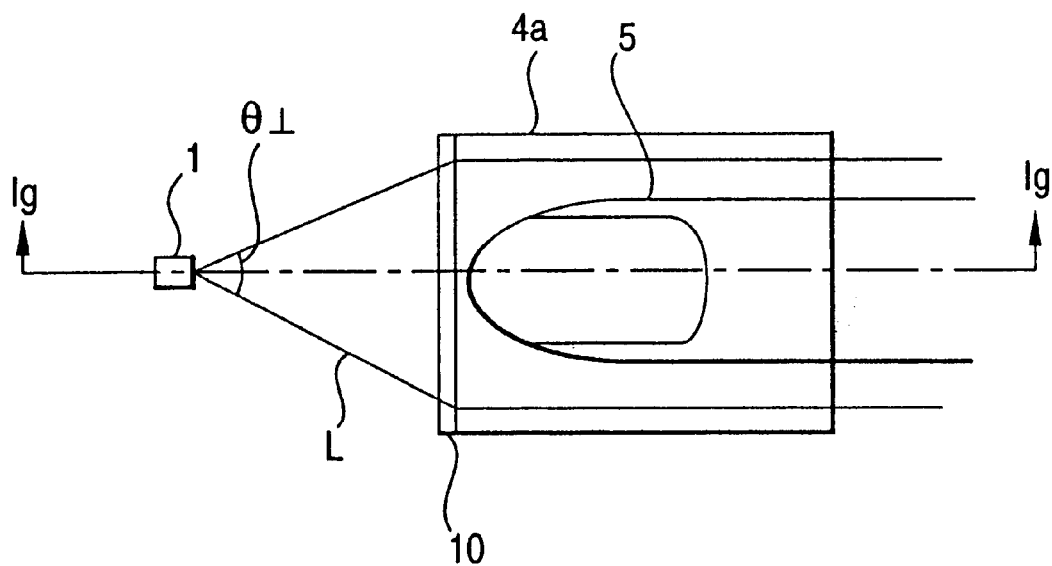
FIGS. 8A and 8B are another schematic diagrams of the uneven-pattern reading apparatus in accordance with the seventh embodiment.
Figure 8B:
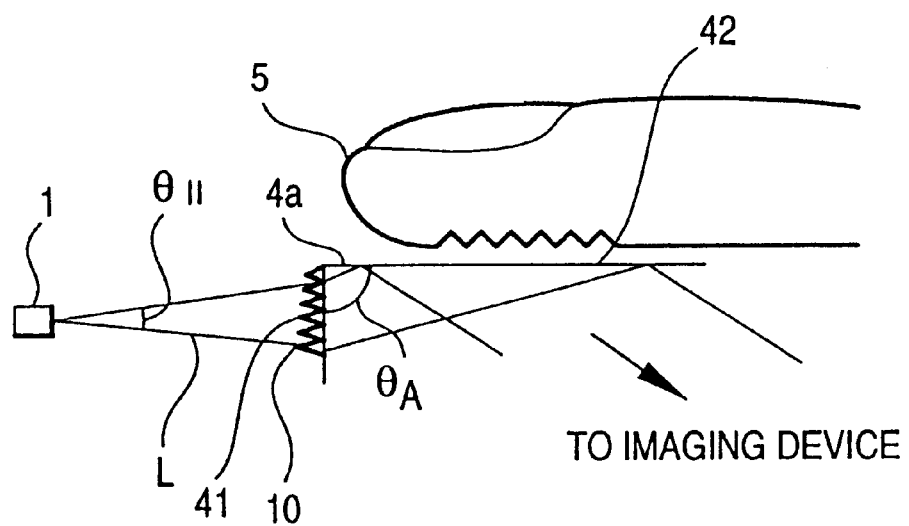

FIGS. 8A and 8B are another schematic diagrams of the uneven-pattern reading apparatus in accordance with the seventh embodiment. FIG. 8A is a plan view, and FIG. 8B is a cross-sectional view taken along line Ig—Ig of FIG. 8A. Since the angle between the incident surface 41 and the detecting surface 42 of the detecting prism 4 is made orthogonal and the shape is simplified, so that it is possible to obtain a compact uneven-pattern reading apparatus in its assembled form.

Eighth Embodiment

Figure 9A:
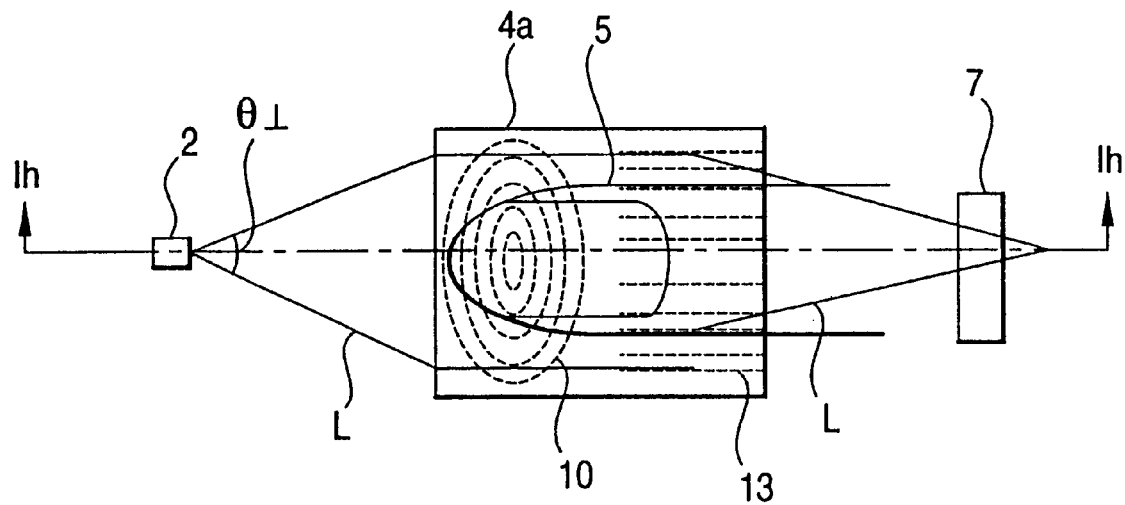
FIGS. 9A and 9B are schematic diagrams of an uneven-pattern reading apparatus in accordance with an eighth embodiment.
Figure 9B:
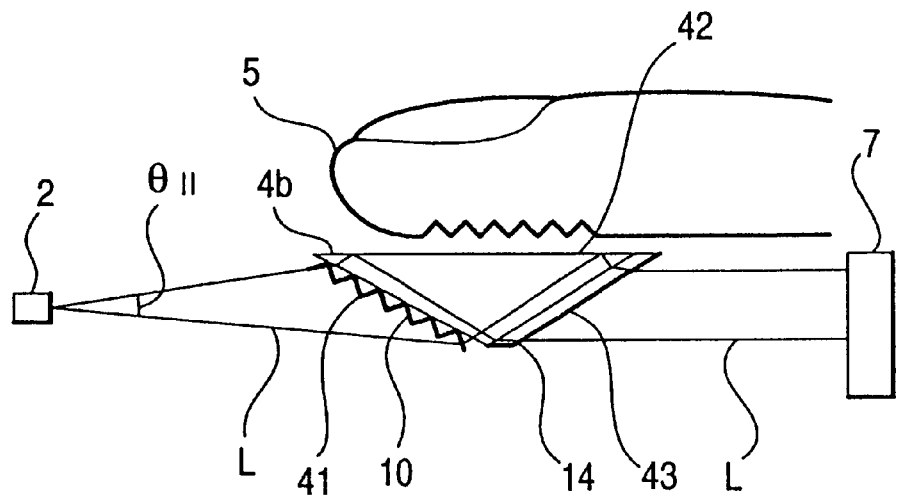

FIGS. 9A and 9B are schematic diagrams of an uneven-pattern reading apparatus in accordance with an eighth embodiment. FIG. 9A is a plan view, and FIG. 9B is a cross-sectional view taken along line Ih—Ih of FIG. 9A. Reference numeral 4b denotes a detecting prism in which fresnel lenses are provided on the incident surface 41 and the emergent surface 43 for making the light beam parallel or convergent in a predetermined direction. Reference numeral 10 denotes the collimating fresnel lens provided on the incident surface 41 so as to allow the incident light beam to be applied to the overall detecting surface. Numeral 14 denotes a reducing fresnel lens provided on the emergent surface 43 so as to converge the emergent light onto the imaging surface of the imaging device 7. Since the other reference numerals denote members or portions that are similar to those of the first to seventh embodiments, a description thereof will be omitted.

Next, a description will be given of the uneven-pattern reading apparatus in accordance with the eighth embodiment. Since the collimating fresnel lens 10 for allowing the incident light beam to be applied to the overall detecting surface is provided on the incident surface 41 of the detecting prism 4b, and the reducing fresnel lens 14 for converging the emergent light onto the imaging surface of the imaging device 7 is provided on the emergent surface 43, the collimator lens 3 or the reducing lens 6 can be omitted. Hence, it is possible to obtain a compact uneven-pattern reading apparatus.

Ninth Embodiment

Figure 10A:
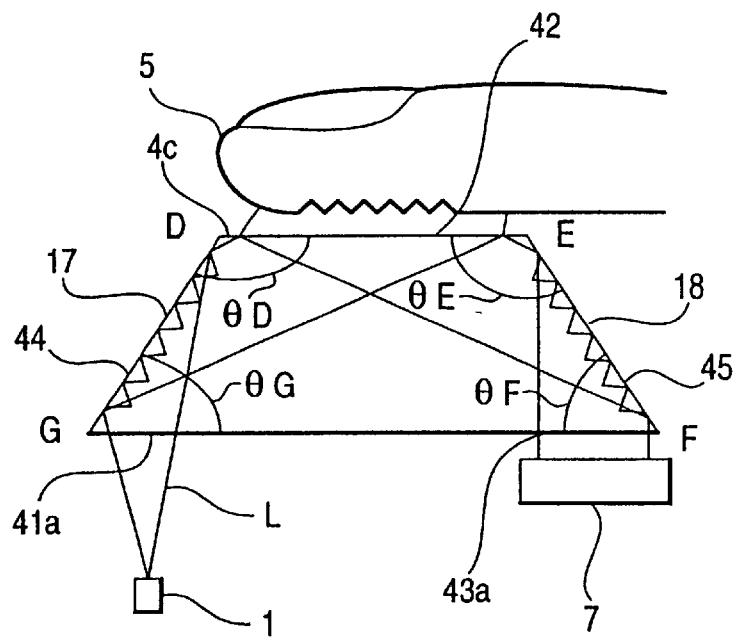
FIGS. 10A and 10B are schematic diagrams of an uneven-pattern reading apparatus in accordance with a ninth embodiment.
Figure 10B:
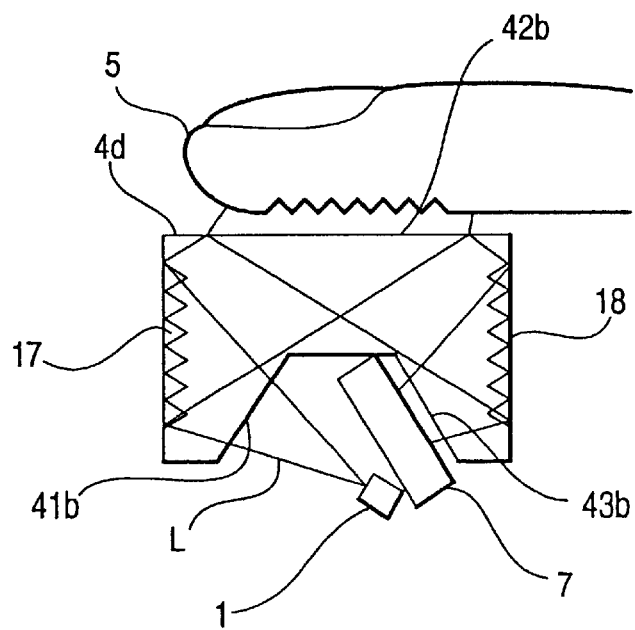

FIG. 10A is a schematic diagram of an uneven-pattern reading apparatus in accordance with a ninth embodiment. FIG. 10B is another schematic diagram of the uneven-pattern reading apparatus in accordance with the ninth embodiment. In the uneven-pattern reading apparatus in accordance with the ninth embodiment, a polygonal deformed detecting prism is adopted. In FIG. 10A, reference numeral 4c denotes a trapezoidal detecting prism. Disposed on the respective slanting surfaces of the trapezoid of the detecting prism 4c are a collimating mirror 17 for reflecting in a predetermined direction the incident light beam L incident from below upon the detecting prism 4c and for applying the incident light beam L to the overall detecting surface, as well as a reducing-mirror 18 for reflecting the reflected image from the detecting surface and for converging the reflected image onto the imaging surface of the imaging device 7.

In addition, in FIG. 10B, reference numeral 4d denotes a rectangular detecting prism which is provided with the collimating mirror 17 for reflecting in a predetermined direction the incident light beam L incident from below upon the detecting prism 4c and for applying the incident light beam L to the overall detecting surface, as well as the reducing mirror 18 for reflecting the reflected image from the detecting surface and for converging the reflected image onto the imaging surface of the imaging device 7. In addition, the rectangular detecting prism 4d is provided with a cavity portion in a bottom portion of the rectangular detecting prism 4d, and the light source 1 and the imaging device 7 are also provided therein.

Figure 11:
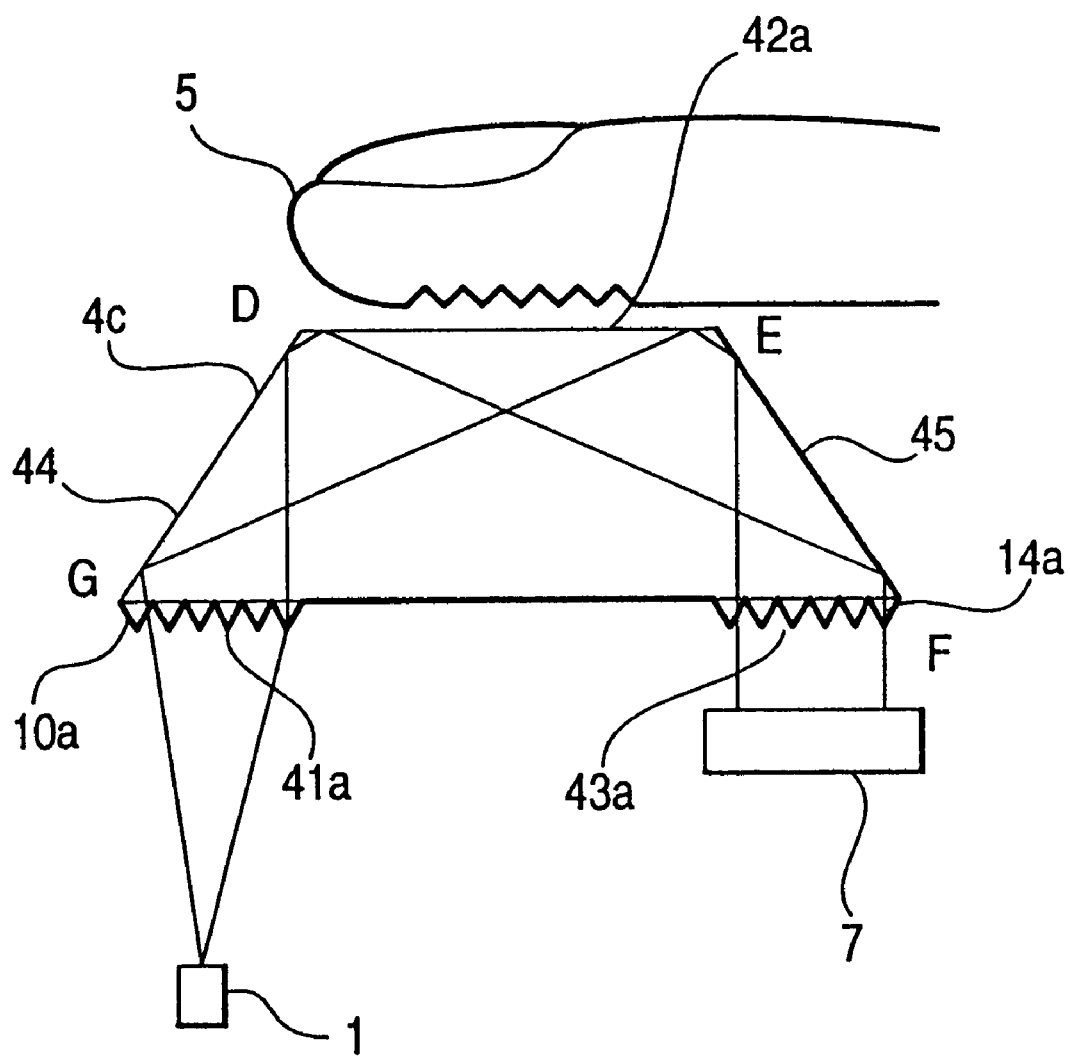
FIG. 11 is another schematic diagram of the uneven-pattern reading apparatus in accordance with the ninth embodiment.

FIG. 11 is still another schematic diagram of the uneven-pattern reading apparatus in accordance with the ninth embodiment. Reference numeral 4e denotes a detecting prism which is arranged as follows. Instead of providing the collimating mirror 17 and the reducing mirror 18 on both side surfaces of the detecting prism 4c in FIG. 10A, a collimating fresnel lens 10a is provided on an incident surface 41a, and a reducing fresnel lens 14a is provided on an emergent surface 43a. Since the other reference numerals denote members or portions that are similar to those of FIGS. 10A and 10B, splotch a description thereof will be omitted.

Next, a description will be given of the operation of the ninth embodiment. In the uneven-pattern reading apparatus in FIG. 10A or 10B, the collimating mirror 17 and the reducing mirror 18 are provided on both left- and right-hand sides of the polygonal deformed detecting prism 4c or 4d so as to reflect the light beam L inside the detecting prism 4c or 4d, thereby illuminating a predetermined detecting surface 42a or 42b and the imaging device 7. Accordingly, it is possible to shorten the overall length of the uneven-pattern reading apparatus, so that it is possible to obtain a compact uneven-pattern reading apparatus.

Tenth Embodiment

Figure 12A:
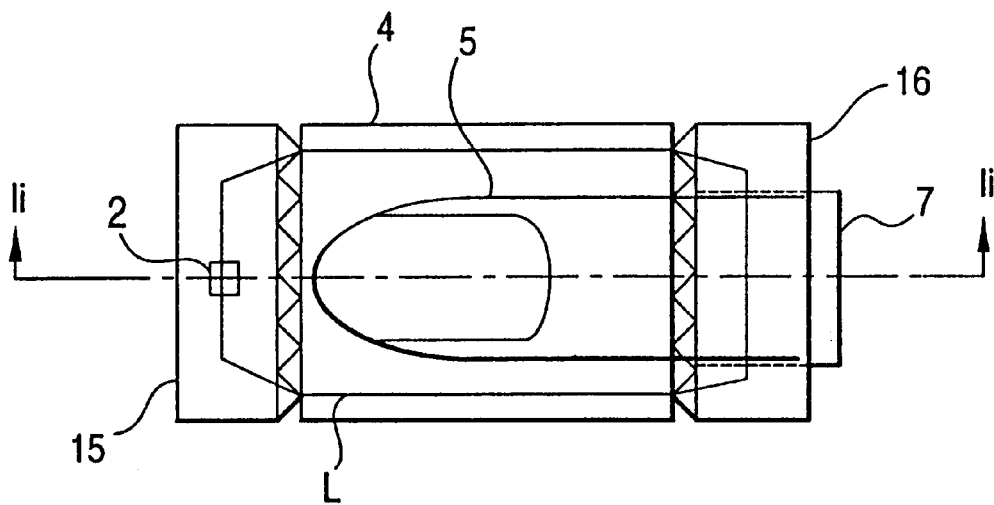
FIGS. 12A and 12B are schematic diagrams of an uneven-pattern reading apparatus in accordance with a tenth embodiment.
Figure 12B:
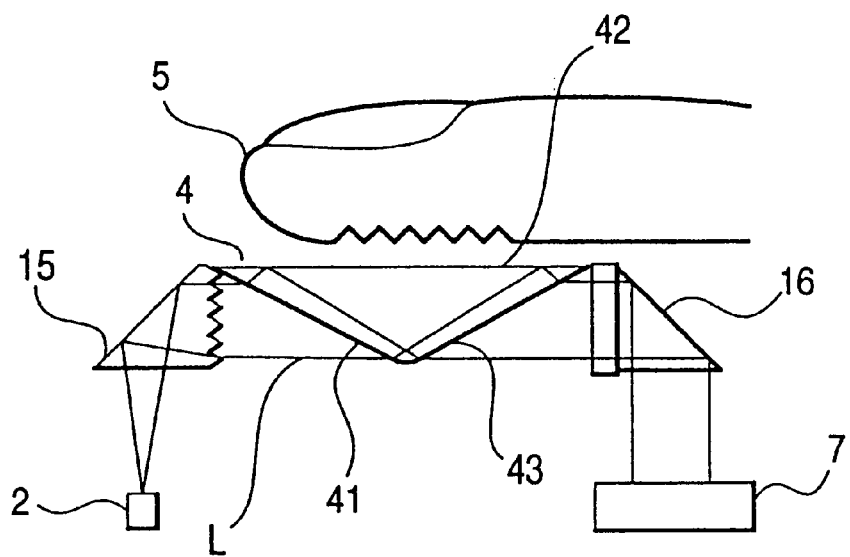

FIGS. 12A and 12B are schematic diagrams of an uneven-pattern reading apparatus in accordance with a 10th embodiment. FIG. 12A is a plan view, and FIG. 12B is a cross-sectional view taken along line Ii—Ii of FIG. 12A. Reference numeral 15 denotes a collimator with a prism, which causes the incident light beam from the light source to be incident upon the incident surface 41 of the detecting prism 4 after orthogonally bending the optical path of the incident light beam from the light source, and which is arranged such that a collimating fresnel lens is provided on the emergent surface of the collimator 15 with a prism. Numeral 16 denotes a reducing lens with a prism, which causes the emergent light beam from the emergent surface 43 of the detecting prism 4 upon the imaging surface of the imaging device 7 after orthogonally bending the optical path of the light beam L emergent from the emergent surface 43 of the detecting prism 4.

Figure 13A:
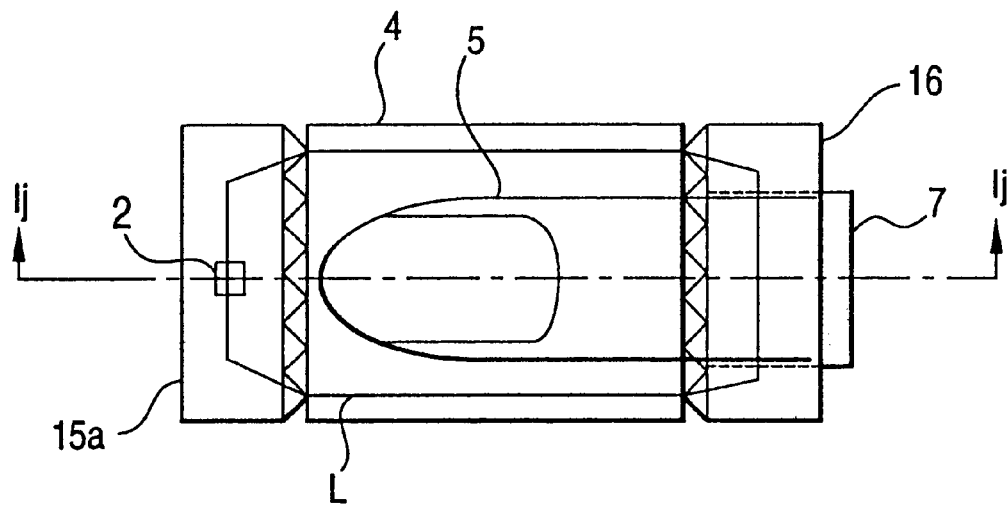
FIGS. 13A and 13B are schematic diagrams of the uneven-pattern reading apparatus in accordance with the tenth embodiment.
Figure 13B:
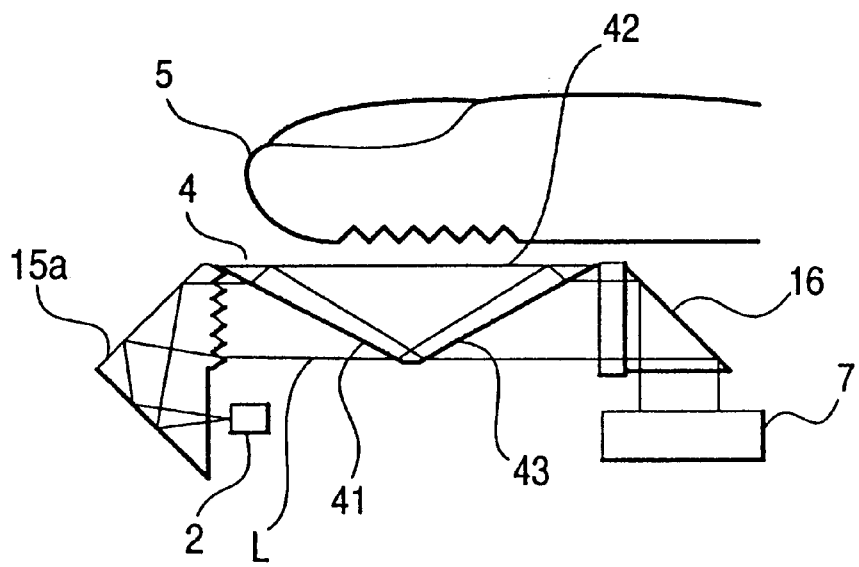

FIGS. 13A and 13B are another schematic diagrams of the uneven-pattern reading apparatus in accordance with the 10th embodiment. FIG. 13A is a plan view, and FIG. 13B is a cross-sectional view taken along line Ij—Ij of FIG. 13A. Reference numeral 15a denotes a collimator with a prism, which causes the incident light beam from the light source to be incident upon the incident surface 41 of the detecting prism 4 after bending in the opposite direction the optical path of the incident light beam from the light source, and which is arranged such that a collimating fresnel lens is provided on the emergent surface of the collimator 15 with a prism. Since the other reference numerals denote members or portions that are similar to those of FIGS. 12A and 12B, a description thereof will be omitted.

Figure 14:
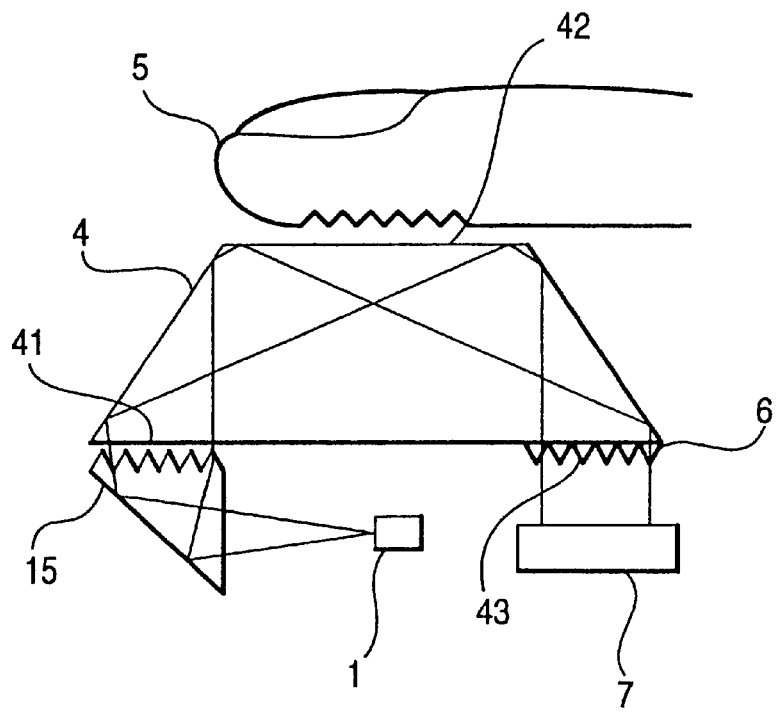
FIG. 14 is still another schematic diagram of the uneven-pattern reading apparatus in accordance with the tenth embodiment.
Figure 15:
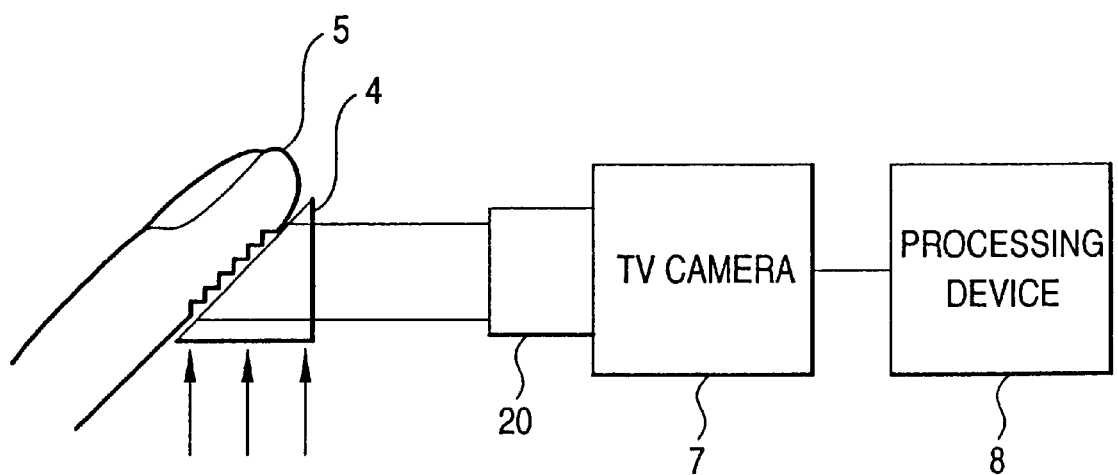
FIG. 15 is a schematic diagram of a conventional uneven-pattern reading apparatus.

FIG. 14 is still another schematic diagram of the uneven-pattern reading apparatus in accordance with the 10th embodiment. Instead of providing the reflecting fresnel lens 10a on the incident surface of the detecting prism 4c in FIG. 11 shown as the ninth embodiment, the collimator 15a with a prism is provided.

Next, a description will be given of the operation of the uneven-pattern reading apparatus in accordance with the 10th embodiment. Since returning means for returning the light beam are provided between the light source and the incident surface of the detecting prism and between the detecting surface and the imaging surface of the imaging device, it is possible to shorten the overall length of the uneven-pattern reading apparatus. Accordingly, it is possible to obtain a compact uneven-pattern reading apparatus.

As described above, in accordance with the first aspect of the present invention the uneven-pattern reading apparatus comprises: a detecting prism having a detecting surface on which an uneven pattern is placed, an incident surface upon which an incident light beam for illuminating the uneven pattern is incident, and an emergent surface from which a reflected light beam of the uneven pattern from the detecting surface is emergent, angles between the respective surfaces being provided such that the incident light beam is applied to the uneven pattern and the reflected light beam from the detecting surface is emergent from the emergent surface; incident-light-beam converging means for causing the incident light beam from the light source to be incident upon the incident surface after making the incident light beam from the light source parallel or convergent with respect to an optical axis of the incident light beam; an imaging device for picking up the reflected image emergent from the detecting prism; a converging optical system for converging the emergent light beam emergent from the emergent surface upon an imaging surface of the imaging device after making the emergent light beam emergent from the emergent surface parallel or convergent; and a processing device for identifying the uneven pattern on the basis of the image picked up by the imaging device, wherein an imaging surface of the imaging device is provided closer toward an emergent surface side than a focusing position of the converging optical system. Therefore, it is possible to reduce the overall optical path length, so that a compact uneven-pattern reading apparatus can be obtained.

In accordance with the second aspect of the present invention, vertical and horizontal magnifications of the incident-light-beam converging means or the emergent-light-beam converging means differ. Therefore, even if light sources whose vertical and horizontal divergent angles differ are used, it is possible to obtain a compact uneven-pattern reading apparatus.

In accordance with the third aspect of the present invention, the incident-light-beam converging mean s has diffusing means provided between the light source and the incident surface of the detecting prism for diffusing the light beam from the light source. Therefore, the distance from the light source 1 to the collimator lens 3 can be shortened, so that it is possible to obtain a compact uneven-pattern reading apparatus whose overall length is short.

In accordance with the fourth aspect of the present invention, the incident-light-beam converging means is arranged such that means for diffusing the light beam and means for making the light beam parallel or convergent are formed integrally. Therefore, it is possible to reduce the number of component parts, and a compact uneven-pattern reading apparatus can be obtained.

In accordance with the fifth aspect of the present invention, the detecting prism has collimating means provided on the incident surface or the emergent surface for making the light beam parallel or convergent in a predetermined direction. Therefore, it is possible to reduce the number of component parts, and a compact uneven-pattern reading apparatus can be obtained.

In accordance with the sixth aspect of the present invention, the detecting prism has angles between surfaces for making the incident light beam and the emergent light beam parallel to the detecting surface. Accordingly, it is possible to obtain a thin and compact uneven-pattern reading apparatus.

In accordance with the seventh aspect of the present invention, means for making the incident light beam upon the incident surface of the detecting prism has returning means for returning the light beam, the returning means being provided between the light source and the incident surface of the detecting prism or between the detecting surface and the imaging surface of the imaging device. Therefore, it is possible to obtain a compact uneven-pattern reading apparatus whose overall length is short.

What is claimed is:

1. An uneven-pattern reading apparatus comprising:

a detecting prism having a detecting surface on which an uneven pattern is placed, an incident surface upon which an incident light beam for illuminating the uneven pattern is incident, and an-emergent surface from which a light beam reflected from the uneven pattern on the detecting surface is emergent, angles between the respective incident, detecting, and emergent surfaces providing that the incident light beam is applied to the uneven pattern and the light reflected from the detecting surface is emergent from the emergent surface;

incident-light-beam converging means for collimating or converging the incident light beam from a light source before incidence on the incident surface;

an imaging device for detecting a reflected image emergent from said detecting prism;

a converging optical system for converging the emergent light beam emergent from the emergent surface upon an imaging surface of said imaging device after collimating or converging the emergent light; and a processing device for identifying the uneven pattern on the basis of the image detected by said imaging device, wherein the imaging surface of said imaging device is located closer to an emergent surface side than a focusing position of said converging optical system.

2. The uneven-pattern reading apparatus according to claim 1, wherein vertical and horizontal magnifications of one of said incident-light-beam converging means and said converging optical system differ.

3. The uneven-pattern reading apparatus according to claim 1, wherein said incident-light-beam converging means has diffusing means located between said light source and the incident surface of said detecting prism for diffusing the light beam from said light source.

4. The uneven-pattern reading apparatus according to claim 2, wherein said incident-light-beam converging means includes integral means for diffusing the light beam and means for collimating or converging the light beam.

5. The uneven-pattern reading apparatus according to claim 1, wherein said detecting prism has collimating means located on one of the incident surface and the emergent surface for collimating the light beam in a predetermined direction.

6. The uneven-pattern reading apparatus according to claim 1, wherein the angles between the detecting, incident, and emergent surfaces make the incident light beam and the emergent light-beam parallel to the detecting surface.

7. The uneven-pattern reading apparatus according to claim 1, including returning means for returning the light beam, said returning means being located between one of (i) said light source and the incident surface of said detecting prism and (ii) the detecting surface and the imaging surface of said imaging device.

* * * * *